(12) United States Patent
Cao

(10) Patent No.: US 8,782,699 B2
(45) Date of Patent: Jul. 15, 2014

(54) METHOD, SYSTEM AND TERMINAL FOR ACQUIRING ELECTRONIC SERVICE GUIDE INFORMATION OF MOBILE PHONE TV

(75) Inventor: Gang Cao, Shenzhen (CN)

(73) Assignee: ZTE Corporation, Guangdong (CN)

( * ) Notice: Subject to any disclaimer, the term of this patent is extended or adjusted under 35 U.S.C. 154(b) by 461 days.

(21) Appl. No.: 12/812,348

(22) PCT Filed: Dec. 24, 2008

(86) PCT No.: PCT/CN2008/002065
§ 371 (c)(1),
(2), (4) Date: Jul. 9, 2010

(87) PCT Pub. No.: WO2010/034142
PCT Pub. Date: Apr. 1, 2010

(65) Prior Publication Data
US 2010/0279668 A1   Nov. 4, 2010

(30) Foreign Application Priority Data
Sep. 25, 2008 (CN) .......................... 2008 1 0149385

(51) Int. Cl.
*G06F 3/00* (2006.01)
*H04N 21/414* (2011.01)
*H04N 21/658* (2011.01)
*H04N 7/173* (2011.01)
*H04N 21/482* (2011.01)
*H04N 21/84* (2011.01)
*H04L 12/58* (2006.01)
*H04M 11/00* (2006.01)

(52) U.S. Cl.
CPC ..... *H04N 21/6581* (2013.01); *H04N 21/41407* (2013.01); *H04N 7/17318* (2013.01); *H04N 21/482* (2013.01); *H04N 21/84* (2013.01)
USPC .................. 725/39; 725/40; 725/41; 725/42; 455/412.1; 379/88.13

(58) Field of Classification Search
CPC ....................................... H04W 4/12
USPC .................... 455/414.1, 332, 414.4
See application file for complete search history.

(56) References Cited

U.S. PATENT DOCUMENTS

2003/0149981 A1 * 8/2003 Finster et al. ................... 725/46
(Continued)

FOREIGN PATENT DOCUMENTS

CN       101212530 A    7/2008
(Continued)

OTHER PUBLICATIONS

International Search Report on international application No. PCT/CN2008/002065, mailed on Jul. 9, 2009.

(Continued)

*Primary Examiner* — Huy C Ho
(74) *Attorney, Agent, or Firm* — Fredrikson & Byron, PA

(57) ABSTRACT

The present invention provides a method for acquiring electronic service guide (ESG) information of a mobile phone TV, including: after encapsulating the ESG information into a multimedia message, the network side sends the multimedia message to a mobile phone TV terminal. The present invention also provides a system for acquiring the ESG information of a mobile phone TV, and the system is used for sending a multimedia message to a mobile phone TV terminal after encapsulating the ESG information into the multimedia message. The present invention also provides a mobile phone TV terminal, which is used for receiving the multimedia message from the multimedia message center and acquiring the ESG information from the multimedia message. The method for acquiring the ESG information as provided in the present invention allows the terminal to be able to quickly acquire the ESG information in real time by sending the ESG information via the multimedia message, thereby enhancing user experience.

9 Claims, 2 Drawing Sheets

(56) References Cited

U.S. PATENT DOCUMENTS

| | | | |
|---|---|---|---|
| 2005/0210145 A1* | 9/2005 | Kim et al. | 709/231 |
| 2006/0019618 A1* | 1/2006 | Seppala | 455/121 |
| 2006/0174268 A1 | 8/2006 | Matero | |
| 2007/0117540 A1* | 5/2007 | Ekdahl | 455/412.1 |
| 2007/0118586 A1 | 5/2007 | Hwang et al. | |
| 2007/0220553 A1* | 9/2007 | Branam et al. | 725/46 |
| 2007/0277204 A1 | 11/2007 | Jeon et al. | |
| 2008/0155596 A1* | 6/2008 | Rosberg et al. | 725/39 |
| 2009/0144768 A1* | 6/2009 | Nagaraja | 725/39 |

FOREIGN PATENT DOCUMENTS

| | | |
|---|---|---|
| EP | 1833245 A2 | 9/2007 |
| EP | 2068557 A1 | 6/2009 |
| KR | 20070075529 A | 7/2007 |
| KR | 20070111082 A | 11/2007 |
| WO | 2006053953 A1 | 5/2006 |
| WO | 2007052976 A1 | 5/2007 |

OTHER PUBLICATIONS

English Translation of the Written Opinion of the International Search Authority in international application No. PCT/CN2008/002065, mailed on Jul. 9, 2009.

International Preliminary Report on Patentability dated Mar. 29, 2011 for PCT/CN2008/002065.

Notification of the Second Office Action of Australian application No. 2008362055, issued on Jun. 4, 2012.

Supplementary European Search Report in European application No. 08877021.9, mailed on Feb. 10, 2014.

Coulombe, S. et al., "Multimedia adaptation for the multimedia messaging service," IEEE Communications Magazine, vol. 42, No. 7, 2004-07-01, 7 pgs.

* cited by examiner

METHOD, SYSTEM AND TERMINAL FOR ACQUIRING ELECTRONIC SERVICE GUIDE INFORMATION OF MOBILE PHONE TV

RELATED APPLICATIONS

This application is a 35 U.S.C. 371 national stage filing from International Application No. PCT/CN2008/002065 filed Dec. 24, 2008 and to Chinese Patent Application No. 200810149385.2 filed Sep. 25, 2008, the teachings of which are incorporated herein by reference.

TECHNICAL FIELD

The present invention relates to a method, system and terminal for acquiring ESG (Electronic Service Guide) in the field of mobile phone TVs (or called mobile multimedia broadcasting).

BACKGROUND

With the advent of the 3G (3rd generation) era, technologies related to mobile phone TVs are increasingly becoming a hotspot of research in the field of communication electronics. In actual applications, in order to use a mobile phone TV terminal to watch TV programs, it is first necessary to acquire ESG information via ESG browser application of the terminal and provide the ESG information to the terminal user. The ESG comprises all information of services available for the current mobile phone TV (including information such as TV channels, TV programs, video file download, and media play parameters, etc); through such information, the user can choose those services which he or she is interested in.

Generally, the process of the mobile phone TV terminal acquiring the ESG is that the ESG browser of the mobile phone TV terminal calls a CDP (Content Delivery Protocol) module to collect an ESG startup file from the current mobile phone TV broadcasting network, and by analyzing the file, all ESG container files containing the ESG information that are currently being broadcasted in the network can be known. The CDP module will then transfer these ESG container files to an ESG engine module for parsing, and finally the ESG browser presents the ESG to the user by querying related ESG information with the ESG engine module. Such conventional method for acquiring mobile phone TV ESG mainly has some of the following problems:

1) upon powering up of the mobile phone TV terminal, it takes a long time for the ESG loading process from the moment the CDP module collects the ESG startup file to the moment the ESG completes parsing all ESG container files, especially when the number of the ESG container files is large, the time that the system consumes would become even longer and generally would be more than a dozen seconds; if the user should repeatedly start up the mobile phone TV ESG browser application within a certain period of time, then he or she can not browse the ESG information to choose TV channels and play programs until having waited for a very long time each time, this is intolerable to the user and at the same time would also excessively consume the battery energy of the terminal;

2) for some terminals, in order to solve the problem to realize fast ESG loading, the ESG engine module will save ESG data used at this time into a local data file every time when the ESG browser application exits so that it is no longer necessary to call the CDP module at the next time when the ESG browser application starts up, the ESG engine module can directly and quickly import the ESG data from the local file into the memory, which is provided for the ESG browser to use in queries; however, this also brings another problem at the same time, i.e. if the ESG information in the network has changed during the period of time between the previous exit and the current start of the ESG browser application, now if the ESG engine still directly imports the locally saved ESG data file and presents it to the user via the ESG browser, then some of TV channel and program information that the user views is already expired, and especially if some of the ESG play parameters have changed, then the user will be unable to watch TV programs normally;

3) during the actual application process, most mobile phone TV terminal users only care about information related to those TV channels in which they are interested, but the conventional method for acquiring ESG is required to acquire the entire ESG container file and parse out the complete ESG information before the ESG is provided for the users to choose specific TV channel services, thereby the information related to those mobile phone TV channels in which the users are interested can not be obtained quickly.

Therefore, in the mobile phone TV system, it is imperatively necessary to provide a method that can quickly acquire the ESG information in real time, thereby improving the overall performance of the mobile phone TV.

SUMMARY

The technical issue that the present invention intends to address is providing a method, system and terminal for acquiring mobile phone TV ESG, which can quickly acquire ESG information in real time to improve the performance of mobile phone TV services.

In order to solve the above mentioned technical problem, the present invention provides a method for acquiring electronic service guide information of a mobile phone TV, including:

after encapsulating ESG information into a Multimedia Messaging Service (MMS) message, network side sends the MMS message to a mobile phone TV terminal.

Furthermore, the method may be also characterized of that the network side comprises an ESG center and an MMS center, the ESG center encapsulates the ESG information into an MMS message and sends it to the MMS center, and the MMS center sends the MMS message containing the ESG information to the mobile phone TV terminal.

Furthermore, the method may be also characterized of that the method also includes that a user sends a customization request to the network side to customize ESG information.

Furthermore, the method may be also characterized of that the user customizes the ESG information from the network side through one or any combination of the following approaches: customization via short messages, registration on relevant websites of mobile phone TV operators and manual telephone service.

Furthermore, the method may be also characterized of that when encapsulating the ESG information into an MMS message, the network side encapsulates all ESG information of the same channel into one MMS message.

Furthermore, the method may be also characterized of that when encapsulating the ESG information into an MMS message, for ESG information corresponding to each channel, the network side encapsulates a service segment of the ESG information to which the channel corresponds, into a frame of the MMS message, encapsulates each content segment to which the service segment corresponds, and a schedule segment to which the content segment corresponds, into several frames of the MMS message, and encapsulates a play parameter file of the channel into a frame of the MMS message.

Furthermore, the method may be also characterized of that after having received the MMS message, the mobile phone TV terminal displays the MMS message, the user chooses a channel to be played based on the ESG information in the MMS message, and the mobile phone TV terminal plays the channel according to the play parameter file in the ESG information of the channel.

The present invention also provides a system for acquiring electronic service guide information of a mobile phone TV, and the system is used for sending an MMS message to a mobile phone TV terminal after encapsulating ESG information into the MMS message.

Furthermore, the system may be also characterized of that the system comprises an ESG center and an MMS center, wherein the ESG center is used for encapsulating the ESG information into the MMS message, and sending the MMS message to the MMS center;

the MMS center is used for sending the MMS message to the mobile phone TV terminal.

Furthermore, the system may be also characterized of that the ESG center is also used for receiving a customization request from a user, determining ESG information customized by the user, encapsulating the ESG information customized by the user into an MMS message, and sending the MMS message to the MMS center.

Furthermore, the system may be also characterized of that when encapsulating the ESG information into an MMS message, for ESG information corresponding to each channel, the ESG center encapsulates a service segment of the ESG information to which the channel corresponds, into a frame of the MMS message, encapsulates each content segment to which the service segment corresponds, and a schedule segment to which the content segment corresponds, into several frames of the MMS message, and encapsulates a play parameter file of the channel into a frame of the MMS message.

The present invention also provides a mobile phone TV terminal, and the mobile phone TV terminal is used for receiving an MMS message from an MMS center and acquiring ESG information from the MMS message.

Furthermore, the mobile phone TV terminal may be also characterized of that the mobile phone TV terminal is also used for sending a customization request to an ESG center to customize ESG information.

Furthermore, the mobile phone TV terminal may be also characterized of that the mobile phone TV terminal is also used for displaying the MMS message after having received the MMS message, and playing a channel according to a play parameter file in the ESG information of the channel after the user has chosen the channel to be played.

The method of the present invention utilizes the multimedia messaging service-based technology to quickly and easily acquire the ESG information that mobile phone TV users care about, the slide show feature of the multimedia messaging terminal itself can more intuitively and vividly present the ESG information of the mobile phone TV to users in various forms of media, in this way the tedious process in the conventional method for acquiring ESG is avoided, in which the CDP module always has to collect all ESG container files in the current network and send them to the ESG engine module for parsing every access to the ESG browser application, therefore it is not necessary for the user to wait for a very long time every time before he or she can browse a TV program, and this can also ensure the real time of the ESG information, thereby significantly improving the overall performance of the DVB-H mobile phone TV and delivering an extremely good outcome of user experience.

DETAILED DESCRIPTION

The present invention provides a Multimedia Messaging Service (MMS) based method for acquiring ESG information of a mobile phone TV, in which a mobile phone TV operator encapsulates ESG information into an MMS message, and a mobile operator sends the MMS message in real time to a mobile phone TV terminal of a user.

The MMS is a message service provided by mobile operators that is carried over the wireless application protocol (WAP) to transmit multimedia. Its biggest feature is the capability to support multimedia functions and transmit functionally complete contents and information that includes information in all kinds of multimedia formats such as text, image, sound and video, etc. It is simply based on these features of the multimedia messaging service that the present invention has combined the multimedia messaging services and mobile phone TV services together to provide terminal users with a faster and easier method for acquiring ESG. The present invention utilizes the multimedia messaging service to encapsulate the ESG information of those TV channels in which the user is interested into the MMS message and send it directly to the mobile phone TV terminal of the user, in this way, not only can avoid the situation that the user always has to wait for a very long time to collect and parse all ESG container files upon each access to the ESG browser application before he or she can find the TV program information being displayed, but also can ensure the real time of the ESG information, thereby improving the overall performance of the mobile phone TV.

The multimedia messaging service-based method for acquiring ESG of a mobile phone TV as proposed in the present invention is described in further details in conjunction with the accompanying drawings.

Figure 1:
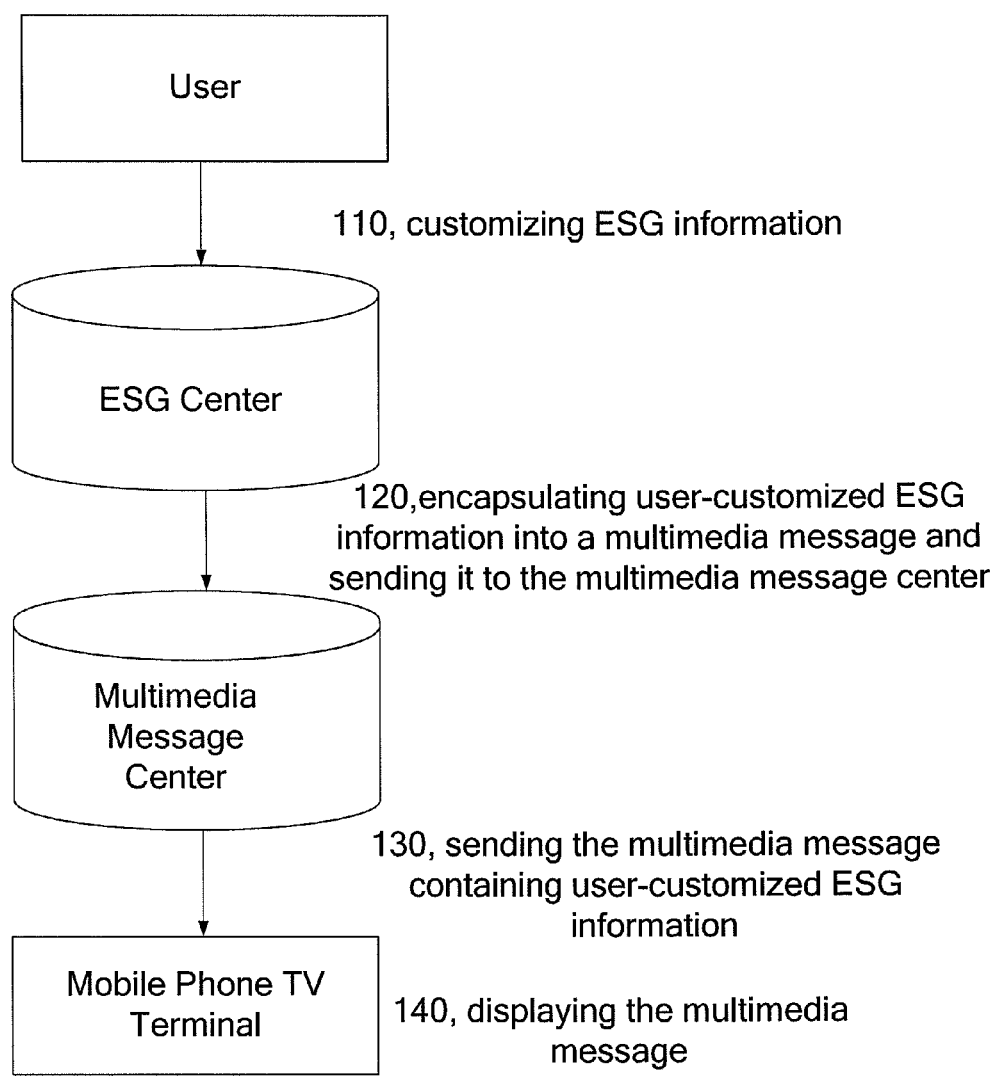
FIG. 1 is an overall architecture diagram of a multimedia messaging service-based method for acquiring mobile phone TV ESG as provided in the present invention.

As shown in FIG. 1, the present invention provides Embodiment 1 of the multimedia messaging service-based method for acquiring ESG of a mobile phone TV, which mainly includes the following steps.

Step 110, the user sends a customization request to an ESG center to customize ESG information.

The mobile phone TV terminal user sends the customization request to the mobile phone TV operator to customize ESG information of channels in which he or she is interested. The customization request is sent to the ESG center maintained by the mobile phone TV operator. Such customization request generally comprises channel numbers, play time (a certain day or a certain time segment), and program contents, etc, of interests of user; the user can customize the ESG information of those mobile phone TV channels of his or her interest in each day or in a certain time segment.

The user customizes the ESG information through various approaches such as customization via short messages, registration on relevant websites of mobile phone TV operators and manual telephone service, etc, and all these customization requests will be ultimately sent to related ESG center of the mobile phone TV operator for processing; when customizing via the short message service, it is the mobile operator that will forward the customization request to the mobile phone TV operator.

Step 120, after receiving the customization request, the ESG center edits and encapsulates the user-customized ESG information into an MMS message, and transfers the MMS message containing the ESG information to an MMS center.

After receiving the customization request from the user, the related ESG center of the mobile phone TV operator edits and encapsulates the ESG information of those channels of the interest of user in each day or in a certain time segment into an MMS message, wherein a play parameter file, i.e. session description protocol (SDP) file of each TV channel is separately saved in the form of attachment in a frame of the MMS message.

If there is a large amount of ESG information as a result of a large number of user-customized channels, given the fact that the transmission itself of the MMS message is restricted by size, it is practical to sub-package the ESG in multiple MMS messages, and generally the ESG information of the same channel is integrally saved in the same MMS message, or can also be encapsulated in multiple MMS messages when a channel has a large amount of ESG information; after having encapsulated the ESG information into the MMS message, the ESG center sends such MMS message to the MMS center.

Step 130, the MMS center sends the MMS message to the mobile phone TV terminal of the user.

Step 140, after the mobile phone TV terminal receives the MMS message, the user starts up the terminal MMS application to display the MMS message and, by displaying the MMS message, directly browses the ESG information contained in the MMS message; since it is the ESG information customized by the user himself, the user can directly browse the ESG information of channels of his or her own interest, can choose a channel, and can watch the TV programs of the channel by transmitting the play parameter file, i.e. the SDP file, of the channel in the MMS message directly to a TV player of the mobile phone TV terminal.

After the mobile phone TV terminal has received the MMS message containing his or her own customized ESG information, the user can activate the MMS application to browse the MMS message, i.e. browsing the ESG information. When the MMS is displayed, it is typically always displayed on a timed basis one frame after another in the form of slide shows, the user can quickly browse the information on TV programs of individual channels through these slides, all such information is presented to user directly in the form of text, pictures, audio and video, including the program schedule of a certain TV channel, the synopsis of a certain TV program, and the video clips of a certain TV program, etc.

When desiring to choose to watch a certain TV channel, the user can stop the exact single frame in which the SDP file of the TV channel is contained and activate a TV watch function on the mobile phone TV terminal, the function is primarily intended to transmit the SDP file of the channel to primary application service of the system, the primary application service will then activate the TV player to play the programs of the channel by transmitting the SDP file to the TV player for parsing and, upon completion of parsing, acquiring all play parameters of the channel chosen by the user. The user can also save the SDP file of the channel that he or she has chosen to watch into the mobile phone TV terminal, activate the TV player to call the SDP file, and play the programs of the channel.

In another embodiment of the present invention, it is also practical to arrange the ESG center to send the ESG information to the MMS center, and the MMS center will then encapsulate the ESG into an MMS message and send it to the mobile phone TV terminal of the user.

Figure 2:
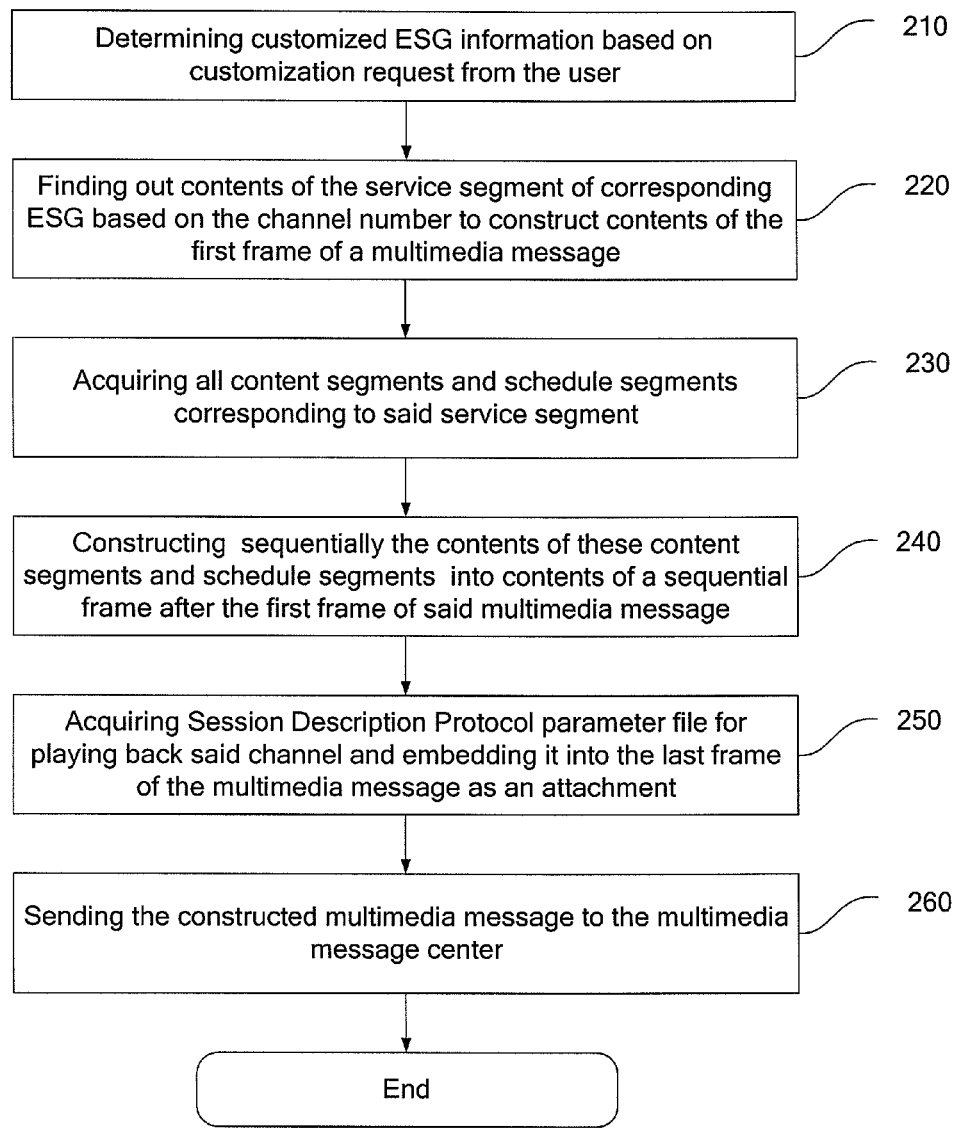
FIG. 2 is a processing flowchart that an ESG center constructs user-subscribed ESG information into an MMS message as proposed in the present invention.

FIG. 2 shows Embodiment 2 of the present invention, where the process that the ESG center edits and encapsulates the user-customized ESG information into an MMS message further includes the following steps:

Step 210: after receiving the customization request from a user, the ESG center determines the user-customized ESG information according to the customization request, such as acquiring the ESG information to which a channel number corresponds based on the channel number in the customization request;

Step 220: the user-customized ESG information is encapsulated into an MMS message, the MMS message generally comprises an MMS message body and an MMS message header, and the user-customized ESG information is encapsulated in the MMS message body; when encapsulating the ESG information of each channel, it is first to acquire a service segment in the ESG information to which the channel corresponds, and the contents of the segment mainly describe general information of the corresponding TV channel, such as channel name, channel LOGO, and channel introductions, etc; the contents of the service segment are constructed into the first frame of the MMS message, wherein text information such as channel name and channel introductions, etc, is altogether filled in the text file of the first frame, and the channel LOGO is embedded into the first frame as a picture file;

Step 230: all content segments to which the service segment corresponds and a schedule (program schedule) segment to which each content segment corresponds are queried, wherein the content segment describes the contents of a certain specific program such as title, program synopsis, posters (picture files) of the program, and audio/video anthologies of the program, while the schedule segment describes specific broadcast information of the program;

Step 240: the contents of each content segment and its corresponding schedule segment are constructed into a new frame, which is placed in succession after the first frame generated in Step 220, thereby producing a slide sequence; generally, when editing the MMS message, it is typically necessary to follow the principles below:

only one picture, not multiple pictures, can be contained in one frame;

only one audio file, not multiple audio files, can be contained in one frame;

only one video file, not multiple video files, can be contained in one frame;

one picture file can coexist with one audio file in one frame;

one picture file can not coexist with one video file in one frame;

one audio file can not coexist with one video file in one frame;

therefore, if there are multiple pictures, audio or video in the content segment at the same time, then according to the above principles, new frames will be generated to store multiple media files, at the same time these new frames will be placed after the mother frame of the content segment, and such mother frame means the first frame constructed using information of the content segment and its corresponding schedule segment; one content segment and its corresponding schedule segment are encapsulated into several continuous frames; all content segments and their corresponding schedule segments are encapsulated.

Step 250: the play parameter file for playing the channel, such as the SDP parameter file is obtained and embedded into the last frame of the MMS message as an attachment; of course, it is not limited to being embedded into the last frame of the MMS message, and can also be embedded into another frame;

Step 260: after filling in the MMS message header with the header information of the MMS message such as the recipient address and subject, etc, the MMS message, which consists of the MMS message header and the previous MMS message body constructed during the previous step after MMS coding all together, is sent to the MMS center, and finally the MMS center sends the MMS message to the mobile phone TV terminal of the user.

During the process of Embodiment 2, the ESG information of one channel is encapsulated into one MMS message, if the ESG information of multiple channels is encapsulated into one MMS message, then similar to the encapsulation of the ESG information of one channel, the service segment, content segment and their corresponding schedule segment of the ESG information of the next channel as well as the play parameter file of the channel are acquired respectively after completing encapsulating the ESG information of one channel, and are encapsulated into multiple frames until completing encapsulating the ESG information of the multiple channels.

The method for encapsulating the ESG information into an MMS message is not limited to encapsulating in a sequence of service segment, content segment and schedule segment, content segment and schedule segment, . . . , till play parameter file as described in Embodiment 2, the sequence can also be disrupted, and the sequence of individual frames within the content segment and schedule segment is also not restricted as long as the ESG information is encapsulated into individual frames of the MMS message, and no limitation applies to the encapsulation sequence and the encapsulation method of the service segment, content segment and their corresponding schedule segment as well as the play parameter file of the channel contained in the specific ESG information, and no limitation applies to the number of frames in which each ESG information segment (service segment, content segment, schedule segment, and play parameter file, etc) is encapsulated.

The present invention also provides a mobile phone TV terminal, which is used for sending a customization request to the ESG center to customize ESG information, receiving an MMS message from the MMS center, acquiring the ESG information from the MMS message, displaying the MMS message after receiving it, and playing a channel according to the play parameter file in the ESG information of the channel after the user has chosen the channel to be played.

INDUSTRIAL APPLICABILITY

The method as mentioned in the present invention utilizes the multimedia messaging service-based technology to quickly and easily acquire the ESG information that mobile phone TV users care about, the slide show feature of the MMS terminal itself can more intuitively and vividly present the ESG information of the mobile phone TV to users in various forms of media, in this way the tedious process in the conventional method for acquiring the ESG is avoided, in which the CDP module always has to collect all ESG container files in the current network and send them to the ESG engine module for parsing upon every access to the ESG browser application, so that it is not necessary for the user to wait for a very long time every time before he or she can browse a TV program, and this can also ensure the real time of the ESG information, thereby significantly improving the overall performance of the DVB-H mobile phone TV and delivering an extremely good outcome of user experience.

What is claimed is:

1. A method for acquiring electronic service guide (ESG) information of a mobile phone TV, comprising:
   encapsulating, by a network side, ESG information into a Multimedia Messaging Service (MMS) message: and
   sending, by the network side, the MMS message including the ESG information to a mobile phone TV terminal, which then acquires the ESG information from the MMS message;
   wherein when encapsulating the ESG information into the MMS message, for ESG information corresponding to each channel, the network side encapsulates a service segment of the ESG information corresponding to each channel into one frame of the MMS message, encapsulates each content segment corresponding to the service segment and a schedule segment corresponding to the content segment into several frames of the MMS message, and encapsulates a play parameter file of the channel into one frame of the MMS message.

2. The method according to claim 1, wherein the network side comprises an ESG center and an MMS center, the ESG center encapsulates the ESG information into the MMS message and sends the MMS message to the MMS center, and the MMS center sends the MMS message containing the ESG information to the mobile phone TV terminal.

3. The method according to claim 1, further comprising: a user sending a customization request to the network side to customize the ESG information.

4. The method according to claim 3, wherein the user customizes the ESG information from the network side through one or any combination of the following approaches: customization via short messages, registration on relevant websites of mobile phone TV operators and manual telephone service.

5. The method according to claim 1, wherein when encapsulating the ESG information into the MMS message, the network side encapsulates all ESG information of the same channel into one MMS message.

6. The method according to claim 5, wherein after received the MMS message, the mobile phone TV terminal displays the MMS message, the user chooses the channel to be played based on the ESG information in the MMS message, and the mobile phone TV terminal plays the channel according to the play parameter file in the ESG information of the channel.

7. The method according to claim 1, wherein after received the MMS message, the mobile phone TV terminal displays the MMS message, the user chooses the channel to be played based on the ESG information in the MMS message, and the mobile phone TV terminal plays the channel according to the play parameter file in the ESG information of the channel.

8. A system for acquiring ESG information of a mobile phone TV, comprising an ESG center and an MMS center, wherein
   the ESG center is configured to encapsulate ESG information into an MMS message, and send the MMS message including the ESG information to the MMS center; and
   the MMS center is configured to send the MMS message including the ESG information to the mobile phone TV terminal;
   wherein when encapsulating the ESG information into the MMS message, for ESG information corresponding to each channel, the ESG center is configured to encapsulate a service segment of the ESG information corresponding to each channel into one frame of the MMS message, to encapsulate each content segment corresponding to the service segment and a schedule segment corresponding to the content segment into several frames of the MMS message, and to encapsulate a play parameter file of the channel into one frame of the MMS message.

9. The system according to claim 8, wherein the ESG center further configured to receive a customization request from a user, determine ESG information customized by the user, encapsulate the customized ESG information into a an MMS message, and send the MMS message to the MMS center.

* * * * *